US012649465B2

(12) United States Patent　(10) Patent No.: US 12,649,465 B2
Pinto et al.　(45) Date of Patent: Jun. 9, 2026

(54) VEHICULAR DRIVING ASSISTANCE SYSTEM WITH VEHICLE STATE ESTIMATION

(71) Applicant: Magna Electronics Inc., Auburn Hills, MI (US)

(72) Inventors: Samuel Cerqueira Pinto, Medfield, MA (US); Benjamin L. Ellis, Somerville, MA (US)

(73) Assignee: Magna Electronics Inc., Auburn Hills, MI (US)

( * ) Notice: Subject to any disclaimer, the term of this patent is extended or adjusted under 35 U.S.C. 154(b) by 84 days.

(21) Appl. No.: 18/742,189

(22) Filed: Jun. 13, 2024

(65) Prior Publication Data

US 2024/0416909 A1　Dec. 19, 2024

Related U.S. Application Data

(60) Provisional application No. 63/508,572, filed on Jun. 16, 2023.

(51) Int. Cl.
　*B60W 30/12*　(2020.01)
　*B60W 10/20*　(2006.01)
　(Continued)

(52) U.S. Cl.
　CPC ............ *B60W 30/12* (2013.01); *B60W 10/20* (2013.01); *B60W 50/00* (2013.01); *G01C 21/30* (2013.01); *G06T 7/73* (2017.01); *G06V 20/588* (2022.01); *B60W 2050/0052* (2013.01); *B60W 2420/403* (2013.01); *B60W 2520/10* (2013.01); *B60W 2520/14* (2013.01); *B60W 2520/16* (2013.01);
　(Continued)

(58) Field of Classification Search
　CPC ...... B60W 30/12; B60W 10/20; B60W 50/00; B60W 2050/0052; B60W 2420/403; B60W 2520/10; B60W 2520/14; B60W 2520/16; B60W 2520/18; B60W 2530/18; B60W 2552/53; B60W 2556/40; B60W 2556/50; B60W 2710/20; B60W 2720/10; G01C 21/30; G01C 21/3602; G06T 7/73; G06T 2207/30256; G06V 20/588
　USPC .......................................................... 701/41
　See application file for complete search history.

(56) References Cited

U.S. PATENT DOCUMENTS 5,550,677 A　　8/1996　Schofield et al.
5,670,935 A　　9/1997　Schofield et al.
(Continued)

*Primary Examiner* — Yi-Kai Wang
(74) *Attorney, Agent, or Firm* — HONIGMAN LLP

(57)　　　　ABSTRACT

A vehicular driving assistance system includes a camera disposed at a vehicle and an electronic control unit (ECU). The vehicular driving assistance system, responsive to processing at the ECU of image data captured by the camera, determines lane markers for a traffic lane along which the vehicle is traveling. The system, using a first Kalman filter and based on the determined lane markers, a lateral lane offset of the vehicle. The vehicular driving assistance system, responsive to processing by the data processor of GPS data, determines, using a second Kalman filter different from the first Kalman filter, a geographical location of the vehicle. The vehicular driving assistance system, based on the determined lateral lane offset of the vehicle and based on the determined geographical location of the vehicle, controls at least one selected from the group consisting of (i) steering of the vehicle and (ii) velocity of the vehicle.

17 Claims, 5 Drawing Sheets

(51) Int. Cl.

| | |
|---|---|
| *B60W 50/00* | (2006.01) |
| *G01C 21/30* | (2006.01) |
| *G06T 7/73* | (2017.01) |
| *G06V 20/56* | (2022.01) |

(52) U.S. Cl.

CPC ..... *B60W 2520/18* (2013.01); *B60W 2530/18* (2013.01); *B60W 2552/53* (2020.02); *B60W 2556/40* (2020.02); *B60W 2556/50* (2020.02); *B60W 2710/20* (2013.01); *B60W 2720/10* (2013.01); *G06T 2207/30256* (2013.01)

(56) References Cited

U.S. PATENT DOCUMENTS

| | | | |
|---|---|---|---|
| 5,949,331 | A | 9/1999 | Schofield et al. |
| 7,877,175 | B2 | 1/2011 | Higgins-Luthman |
| 7,881,496 | B2 | 2/2011 | Camilleri et al. |
| 7,914,187 | B2 | 3/2011 | Higgins-Luthman et al. |
| 7,930,160 | B1 | 4/2011 | Hosagrahara et al. |
| 7,949,486 | B2 | 5/2011 | Denny et al. |
| 8,017,898 | B2 | 9/2011 | Lu et al. |
| 8,064,643 | B2 | 11/2011 | Stein et al. |
| 8,082,101 | B2 | 12/2011 | Stein et al. |
| 8,095,310 | B2 | 1/2012 | Taylor et al. |
| 8,164,628 | B2 | 4/2012 | Stein et al. |
| 8,224,031 | B2 | 7/2012 | Saito |
| 8,233,045 | B2 | 7/2012 | Luo et al. |
| 8,254,635 | B2 | 8/2012 | Stein et al. |
| 8,300,886 | B2 | 10/2012 | Hoffmann |
| 8,378,851 | B2 | 2/2013 | Stein et al. |
| 8,421,865 | B2 | 4/2013 | Euler et al. |
| 8,694,224 | B2 | 4/2014 | Chundrlik, Jr. et al. |
| 9,205,776 | B2 | 12/2015 | Turk |
| 9,764,744 | B2 | 9/2017 | Bajpai |
| 10,071,687 | B2 | 9/2018 | Ihlenburg et al. |
| 10,099,614 | B2 | 10/2018 | Diessner |
| 2009/0290032 | A1 | 11/2009 | Zhang et al. |
| 2010/0253784 | A1 | 10/2010 | Oleg |
| 2011/0216201 | A1 | 9/2011 | McAndrew et al. |
| 2012/0045112 | A1 | 2/2012 | Lundblad et al. |
| 2012/0069185 | A1 | 3/2012 | Stein |
| 2012/0200707 | A1 | 8/2012 | Stein et al. |
| 2012/0314071 | A1 | 12/2012 | Rosenbaum et al. |
| 2012/0320209 | A1 | 12/2012 | Vico et al. |
| 2013/0141580 | A1 | 6/2013 | Stein et al. |
| 2013/0147957 | A1 | 6/2013 | Stein |
| 2013/0169812 | A1 | 7/2013 | Lu et al. |
| 2013/0286193 | A1 | 10/2013 | Pflug |
| 2014/0043473 | A1 | 2/2014 | Gupta et al. |
| 2014/0063254 | A1 | 3/2014 | Shi et al. |
| 2014/0098229 | A1 | 4/2014 | Lu et al. |
| 2014/0160291 | A1 | 6/2014 | Schaffner |
| 2014/0247352 | A1 | 9/2014 | Rathi et al. |
| 2014/0247354 | A1 | 9/2014 | Knudsen |
| 2014/0320658 | A1 | 10/2014 | Pliefke |
| 2014/0333729 | A1 | 11/2014 | Pflug |
| 2014/0347486 | A1 | 11/2014 | Okouneva |
| 2015/0308827 | A1* | 10/2015 | Fujii ..................... G01C 19/00 702/151 |
| 2021/0086795 | A1 | 3/2021 | Zhao et al. |
| 2022/0101024 | A1* | 3/2022 | Zhang ................. G06V 10/758 |
| 2022/0242401 | A1 | 8/2022 | Thompson et al. |
| 2023/0094371 | A1* | 3/2023 | Varma Bhupatiraju .................... B60W 40/10 701/1 |
| 2023/0391325 | A1* | 12/2023 | Tsuchiya .............. B60W 30/12 |
| 2024/0077582 | A1 | 3/2024 | Cerqueira Pinto et al. |
| 2024/0182026 | A1 | 6/2024 | Ellis et al. |

* cited by examiner

| Variable symbol | Variable name | Required measurements |
|---|---|---|
| $v$ | Longitudinal velocity | Odometry |
| $\omega$ | Yaw rate | IMU |
| $\rho$ | Roll | IMU |
| $\phi$ | Pitch | IMU |
| $\theta$ | Yaw | GPS |
| $lat$ | Latitude | GPS |
| $long$ | Longitude | GPS |
| $y_L$ | Lateral offset to lane | FC, |
| $\psi_L$ | Angular offset to lane | FC |

FIG. 2B

VEHICULAR DRIVING ASSISTANCE SYSTEM WITH VEHICLE STATE ESTIMATION

CROSS REFERENCE TO RELATED APPLICATION

The present application claims the filing benefits of U.S. provisional application Ser. No. 63/508,572, filed Jun. 16, 2023, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

A vehicular driving assistance system, the vehicular driving assistance system includes a camera disposed at an in-cabin side of a windshield of a vehicle equipped with the vehicular driving assistance system. The camera views forward of the equipped vehicle through the windshield of the equipped vehicle. The camera is operable to capture image data. The camera includes an imager that includes a CMOS imaging array having at least one million photosensors arranged in rows and columns. The system includes an electronic control unit (ECU) with electronic circuitry and associated software. The electronic circuitry of the ECU includes at least one data processor. Image data captured by the camera is transferred to and is processed at the ECU, and GPS data captured by a global positioning system is transferred to and processed at the ECU. The vehicular driving assistance system, via processing at the ECU of image data captured by the camera, determines lane markers for a traffic lane along which the equipped vehicle is traveling. The vehicular driving assistance system, via processing at the ECU of image data captured by the camera and based at least in part on the determined lane markers, determines a lateral lane offset of the equipped vehicle using a first Kalman filter. The vehicular driving assistance system, via processing at the ECU of GPS data transferred to the ECU, determines a geographical location of the equipped vehicle using a second Kalman filter. The vehicular driving assistance system, based on the determined lateral lane offset of the equipped vehicle and the determined geographical location of the equipped vehicle, controls at least one selected from the group consisting of (i) steering of the equipped vehicle and (ii) velocity of the equipped vehicle.

These and other objects, advantages, purposes and features of the present invention will become apparent upon review of the following specification in conjunction with the drawings.

BRIEF DESCRIPTION OF THE DRAWINGS

FIG. 2B is a table of variables estimated by the vehicular driving assistance system of FIG. 1;

DESCRIPTION OF THE PREFERRED EMBODIMENTS

In autonomous driving and ADAS applications, it is critical for the vehicle to have awareness of its own state (e.g., the vehicle's velocity, attitude (roll and/or pitch), position with respect to the traffic lanes (i.e., lateral position within the traffic lane), global position, etc.) in order to properly plan and execute the actions of the vehicle.

These states can be estimated using a set of sensors generally present in modern cars (e.g., a front facing camera, an inertial measurement unit (IMU), a GPS sensor, high-definition maps, wheel odometry, etc.). However, many sensors do not always produce valid measurements. For example, a GPS sensor may perform poorly in indoor environments or tunnels or cities with tall buildings. As another example, a camera is generally unable to detect traffic lanes when the traffic lanes are not clearly marked or when experiencing inclement environmental conditions (e.g., heavy rain or snow).

Bayesian filters, such as non-linear extensions of the Kalman Filter, are often the backbone of vehicle state estimation algorithms. A conventional approach when using Kalman filters for such estimations involves using a single state space that includes all the variables to be estimated and passing each through the same filter. However, this approach struggles numerically when one of the states is not observed (even indirectly) for extended periods of time. This can occur, for example, when one of the sensors reaches a non-operational state. In this scenario, the Kalman filters may crash/fail or produce invalid results even for the variables that are being correctly measured (e.g., a lack of GPS signal could lead to incorrect longitudinal velocity estimation).

Implementations herein break up the state-space of the Kalman filter into multiple smaller blocks, such that sensor failure is guaranteed not to affect the quality of the measurements unrelated to that sensor, while simultaneously maintaining the ability to estimate all the variables when all the sensors are operational.

A vehicle vision system and/or driver or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a display, such as a rearview display or a top down or bird's eye or surround view display or the like.

Figure 1:
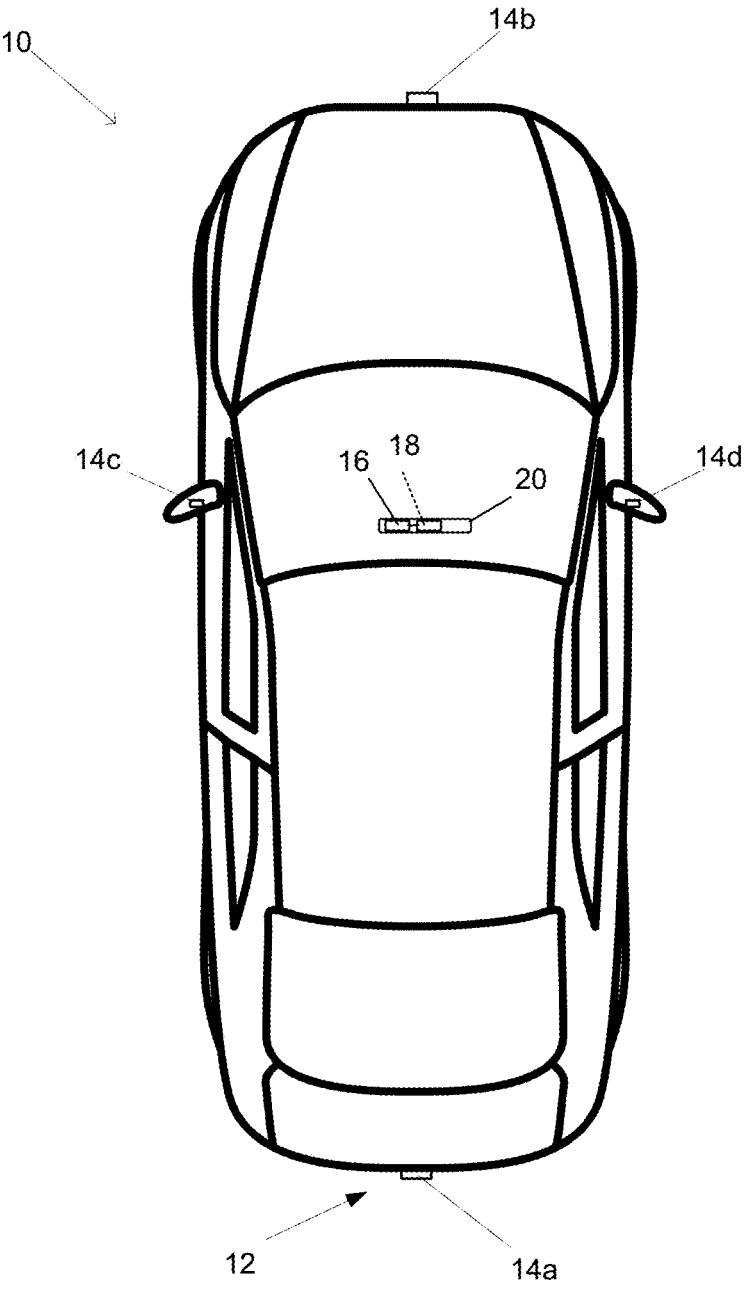
FIG. 1 is a plan view of a vehicle with a vehicular driving assistance system that incorporates cameras.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14*a* (and the system may optionally include multiple exterior viewing imaging sensors or cameras, such as a forward viewing camera 14*b* at the front (or at the windshield) of the vehicle, and a sideward/rearward viewing camera 14*c*, 14*d* at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Figure 2A:
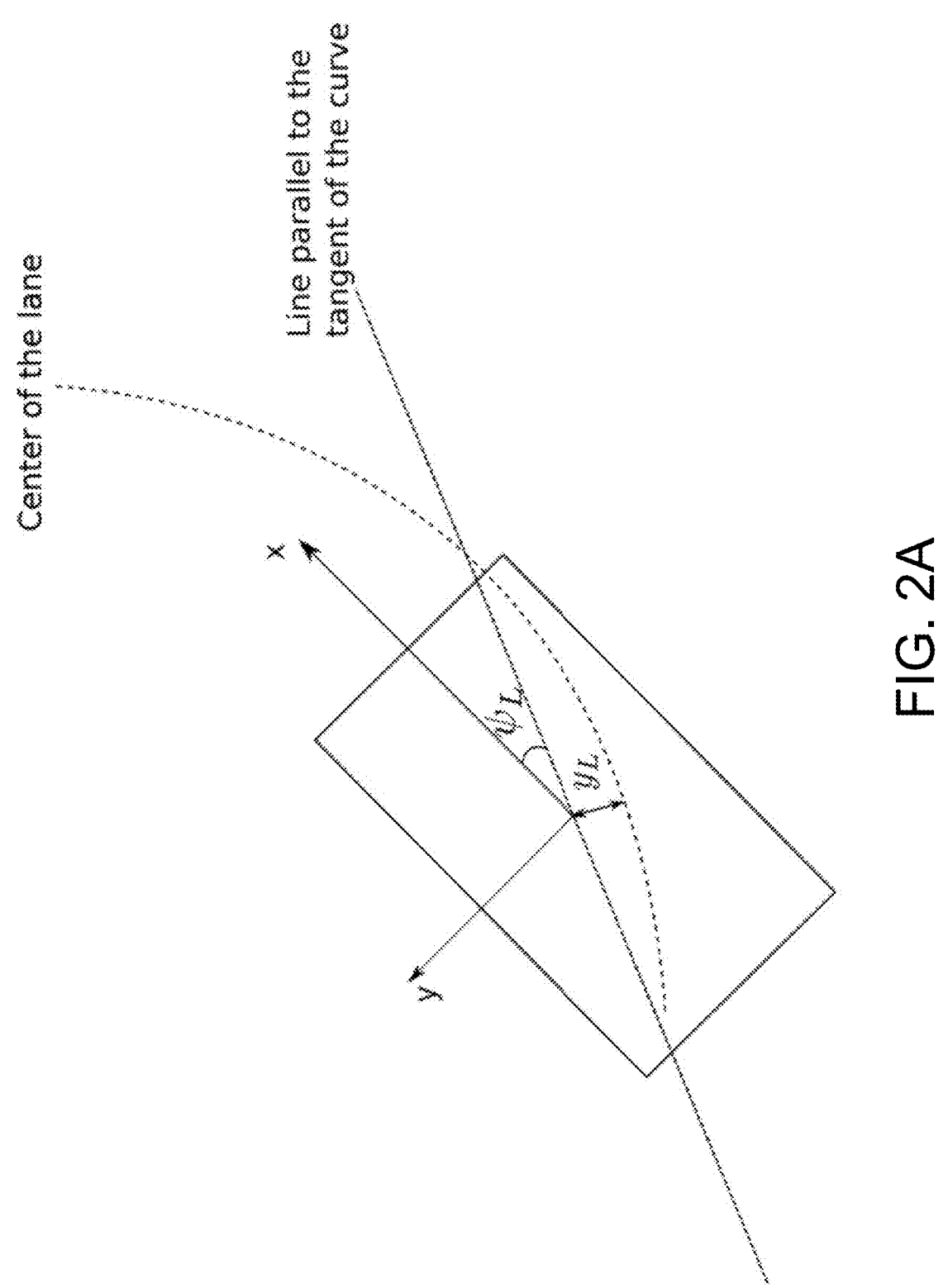
FIG. 2A is a schematic view of a vehicle traveling along a traffic lane.

FIG. 2A illustrates the definition of lateral $(\gamma_L)$ and angular $(\psi_L)$ offsets with respect to the center of a traffic lane the equipped vehicle is traveling along. FIG. 2B includes a table illustrating the variables that a state estimator (FIGS. 3 and 4) estimates to support various ADAS features and where the sensor data for the variables originates from. The variables represent the longitudinal velocity, the yaw rate, roll, pitch, yaw, latitude, longitude, lateral offset to lane, and angular offset to lane for the equipped vehicle.

Figure 3:
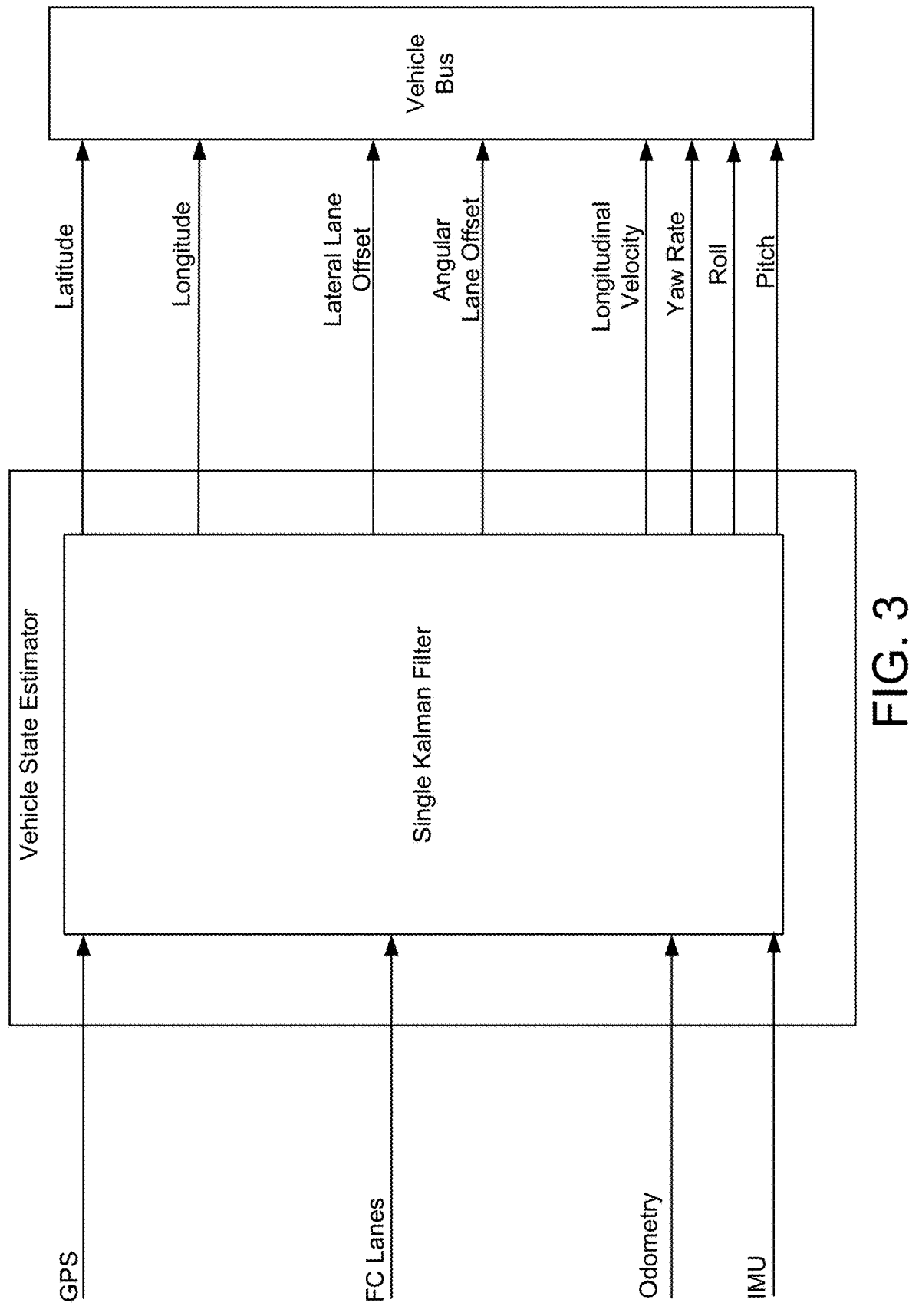
FIG. 3 is a schematic view of a conventional estimator for a vehicle.

FIG. 3 illustrates a conventional vehicle state estimator. Here, the vehicle state estimator includes a single Kalman filter that receives all of the sensor data and other information and generates estimation outputs, such as an estimated latitude and longitude of the equipped vehicle (i.e., a geographical location of the vehicle), lateral lane offset, angular lane offset, longitudinal velocity, yaw rate, roll, pitch, etc. Because of the sensor data captured by each of the several different sensors (e.g., one or more cameras, radar sensors, a GPS sensor, a wheel revolutions per minute (RPM) sensor, etc.), the performance of the Kalman filter (and thus the output of the entire vehicle state estimator) may significantly degrade if the sensor data for any of the sensors becomes invalid.

That is, in the "propagation" step of a Kalman filter, which is triggered at every Kalman filter run, the covariance is increased for all of the variables of the state space. In the "update" step of the Kalman filter, the covariance is decreased only for the variables that are observed (directly or indirectly). Thus, if a variable is not observed (e.g., because a sensor is no longer providing sensor data), then the associated covariance will grow as time passes. However, at the same time, the other variables (that are observed) will not grow, converging at a steady state. If this situation persists, this will result in a covariance matrix with high eigenvalues for the variables that are not observed and low eigenvalues for variables that are being observed. Matrices with simultaneous low and high eigenvalues are ill-conditioned matrices, and performing inversion on ill-conditioned matrices leads to numerical instability in the results. Because the Kalman filter has an inversion of the matrix during the update step, an ill-conditioned covariance matrix can invalidate all states in the state space of the Kalman filter.

Figure 4:
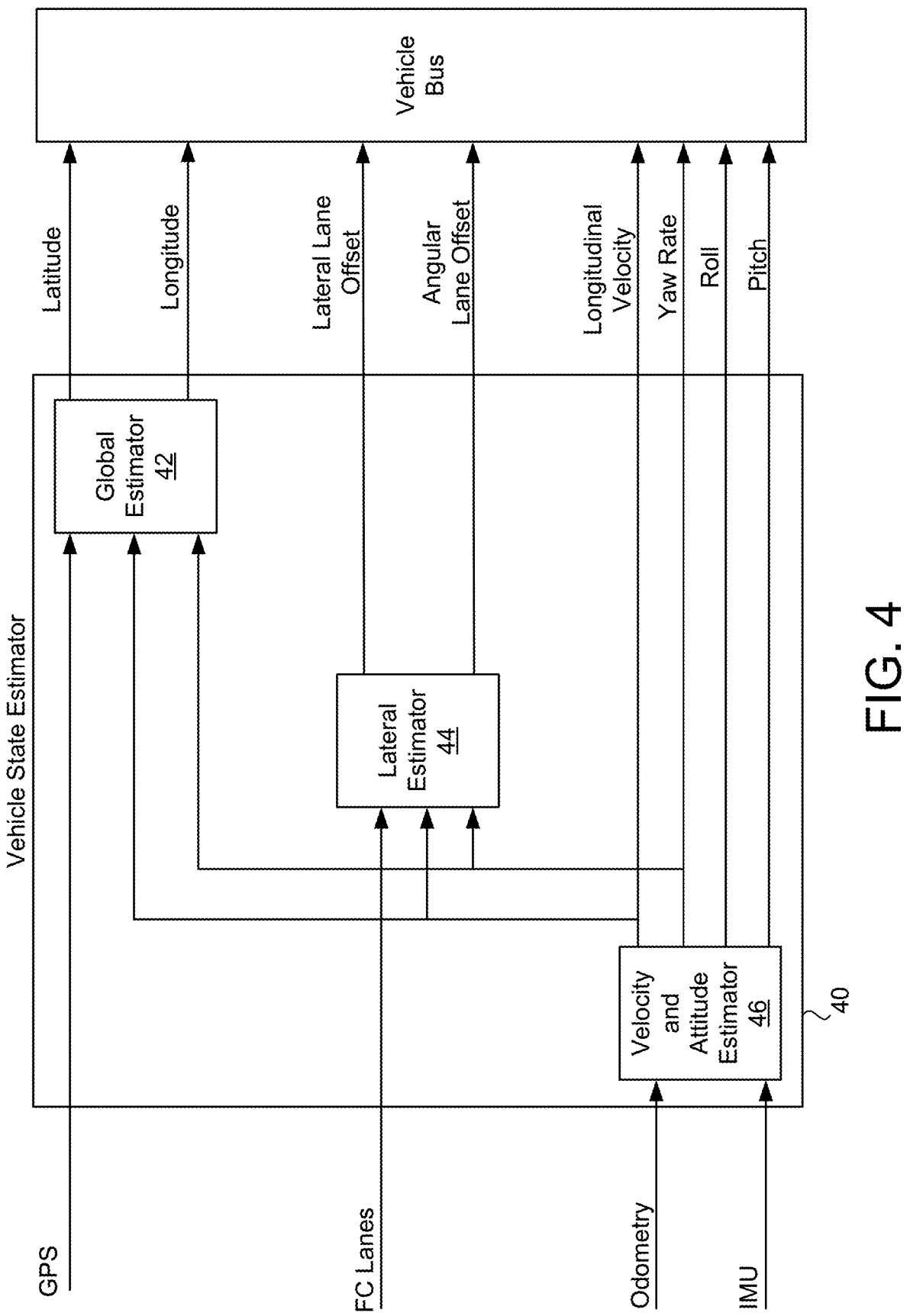
FIG. 4 is a schematic view of a vehicle state estimator of the vehicular driving assistance system of FIG. 1.

Referring now to FIG. 4, a vehicle state estimator 40 includes multiple independent filters (e.g., multiple independent and different Kalman filters). Here, the vehicle state estimator 40 includes a global estimator 42, a lateral estimator 44, and a velocity and attitude estimator 46 independent from each other. Because the vehicle state estimator 40 includes multiple independent and different filters, there is no risk of failure of downstream filters if one of the variables that is provided to a particular filter fails (e.g., a sensor that provides sensor data to one of the filters stops providing sensor data or provides invalid sensor data). For example, when the vehicle state estimator 40 estimates the vehicle state partially from GPS data from a GPS sensor, if the GPS sensor were to fail and stop providing valid GPS data to the global estimator, there is no risk that the failure will affect the outputs of the velocity and attitude estimator 46 (e.g., the velocity estimation) or the lateral estimator 44. This is in contrast to the estimator of FIG. 3, where failure of the GPS sensor would likely impact all of the outputs (including the velocity estimation) of the estimator. This is significant, because some sensors, such as GPS sensors, are at high risk of occasional failure. For example, GPS sensors often do not provide accurate or valid data in regions where GPS signals are not available or indoor environments (e.g., tunnels or parking facilities). As another example, the traffic lane information obtained by the front camera (e.g., from a front camera module (FCM)) may fail to obtain accurate lane data when roads are not clearly marked, in inclement weather, and/or in low illumination conditions.

In addition, the vehicle state estimator 40 reduces computational cost relative to conventional estimators (FIG. 3). The computational cost of Kalman filter complexity scales at $O(n^{2.4})$ with the size of the state space (i.e., the number of outputs). That is, as the size of the state space of a Kalman filter increases, the complexity of the Kalman filter increases rapidly. Thus, by dividing the variables (i.e., inputs and outputs) among multiple independent filters/subsystems, the complexity is reduced and thereby the total computation is substantially reduced.

Thus, the vehicle state estimator uses multiple independent and different filters (e.g., Kalman filters) to predict or estimate a state of the vehicle (e.g., a geographical location of the vehicle based on a comparison to map data or the like, a lateral offset and angular lane offset based on a comparison to lane markers determined from image data captured by a camera, a longitudinal velocity, a yaw rate, roll, and/or pitch of the vehicle). Based on the estimated or predicted state of the vehicle, one or more advanced driver assist systems may control an aspect of the vehicle, such as steering of the vehicle and/or speed of the vehicle. For example, the system processes image data captured by a forward viewing camera. Based on the captured image data, the system determines lane markers or other means for determining along which traffic lane the equipped vehicle is traveling and where in the traffic lane the vehicle is currently located (e.g., the lateral lane offset and/or angulate lane offset). The system may use other data sources, such as map data, to further estimate or determine the state. For example, the system may use map data to help locate the vehicle and/or determine a type of road the vehicle is traveling along (e.g., a highway, a two-lane road, a one-way road, etc.).

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. Of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor of the camera may capture image data for image processing and may comprise, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least one million photosensor elements or pixels or at least three million photosensor elements or pixels or at least five million photosensor elements or pixels arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos.

6

US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular driving assistance system, the vehicular driving assistance system comprising:

a camera disposed at an in-cabin side of a windshield of a vehicle equipped with the vehicular driving assistance system, the camera viewing forward of the equipped vehicle through the windshield of the equipped vehicle;

wherein the camera is operable to capture image data;

wherein the camera comprises an imager, and wherein the imager comprises a CMOS imaging array having at least one million photosensors arranged in rows and columns;

an electronic control unit (ECU) comprising electronic circuitry and associated software;

wherein the electronic circuitry of the ECU comprises at least one data processor;

wherein image data captured by the camera is transferred to and is processed at the ECU, and wherein GPS data captured by a global positioning system is transferred to and processed at the ECU;

wherein the vehicular driving assistance system, via processing at the ECU of image data captured by the camera, determines lane markers for a traffic lane along which the equipped vehicle is traveling;

wherein the vehicular driving assistance system, via processing at the ECU of image data captured by the camera and based at least in part on the determined lane markers, determines a lateral lane offset of the equipped vehicle using a first Kalman filter comprising a first state space;

wherein the vehicular driving assistance system, via processing at the ECU of GPS data transferred to the ECU, determines a geographical location of the equipped vehicle using a second Kalman filter comprising a second state space;

wherein the vehicular driving assistance system determines a longitudinal velocity of the equipped vehicle using a third Kalman filter comprising a third state space;

wherein the first Kalman filter, the second Kalman filter, and the third Kalman filter are independent from each other such that the first state space excludes the geographical location and the longitudinal velocity, and the second state space excludes the lateral lane offset and the longitudinal velocity; and wherein the vehicular driving assistance system, based on the determined lateral lane offset of the equipped vehicle, the determined longitudinal velocity, and the determined geographical location of the equipped vehicle, controls at least one selected from the group consisting of (i) steering of the equipped vehicle and (ii) velocity of the equipped vehicle.

2. The vehicular driving assistance system of claim 1, wherein the vehicular driving assistance system, using the third Kalman filter, further determines (i) a yaw rate of the equipped vehicle, (ii) a roll of the equipped vehicle and (iii) a pitch of the equipped vehicle.

3. The vehicular driving assistance system of claim 2, wherein the vehicular driving assistance system determines, using the third Kalman filter, (i) the longitudinal velocity of the equipped vehicle, (ii) the yaw rate of the equipped vehicle,) the roll of the equipped vehicle and (iv) the pitch of the equipped vehicle based at least in part on (a) odometry data captured by an odometer of the equipped vehicle and (b) inertial measurement data captured by an inertial measurement unit of the equipped vehicle.

4. The vehicular driving assistance system of claim 2, wherein the vehicular driving assistance system controls the at least one selected from the group consisting of (i) steering of the equipped vehicle and (ii) velocity of the equipped vehicle based in part on (a) the determined longitudinal velocity of the equipped vehicle, (b) the determined yaw rate of the equipped vehicle, (c) the determined roll of the equipped vehicle and (d) the determined pitch of the equipped vehicle.

5. The vehicular driving assistance system of claim 2, wherein the vehicular driving assistance system determines the geographical location of the equipped vehicle using the second Kalman filter based in part on (i) the determined longitudinal velocity of the equipped vehicle and (ii) the determined yaw rate of the equipped vehicle.

6. The vehicular driving assistance system of claim 2, wherein the vehicular driving assistance system determines the lateral lane offset of the equipped vehicle using the first Kalman filter based in part on (i) the determined longitudinal velocity of the equipped vehicle and (ii) the determined yaw rate of the equipped vehicle.

7. The vehicular driving assistance system of claim 1, wherein the vehicular driving assistance system, using the first Kalman filter, determines an angular lane offset of the equipped vehicle.

8. The vehicular driving assistance system of claim 1, wherein the vehicular driving assistance system determines the geographical location of the equipped vehicle based in part on map data.

9. The vehicular driving assistance system of claim 1, wherein a failure of the global positioning system does not change the determination of the lateral lane offset.

10. The vehicular driving assistance system of claim 1, wherein a failure of the camera does not change the determination of the geographical location of the equipped vehicle.

11. A vehicular driving assistance system, the vehicular driving assistance system comprising:

a camera disposed at an in-cabin side of a windshield of a vehicle equipped with the vehicular driving assistance system, the camera viewing forward of the equipped vehicle through the windshield of the equipped vehicle;

wherein the camera is operable to capture image data;

wherein the camera comprises an imager, and wherein the imager comprises a CMOS imaging array having at least one million photosensors arranged in rows and columns;

an electronic control unit (ECU) comprising electronic circuitry and associated software;

wherein the electronic circuitry of the ECU comprises at least one data processor;

wherein image data captured by the camera is transferred to and is processed at the ECU, and wherein GPS data captured by a global positioning system is transferred to and processed at the ECU;

wherein the vehicular driving assistance system, via processing at the ECU of image data captured by the camera, determines lane markers for a traffic lane along which the equipped vehicle is traveling;

wherein the vehicular driving assistance system, via processing at the ECU of image data captured by the camera and based at least in part on the determined lane markers, determines, using a first Kalman filter comprising a first state space, (i) a lateral lane offset of the equipped vehicle and (ii) angular lane offset of the equipped vehicle;

wherein the vehicular driving assistance system, via processing at the ECU of GPS data transferred to the ECU, determines, using a second Kalman filter comprising a second state space, a geographical location of the equipped vehicle;

wherein the vehicular driving assistance system determines, using a third Kalman filter comprising a third state space, (i) a longitudinal velocity of the equipped vehicle, (ii) a yaw rate of the equipped vehicle, (iii) a roll of the equipped vehicle and (iv) a pitch of the equipped vehicle;

wherein the first Kalman filter, the second Kalman filter, and the third Kalman filter are independent from each other such that the first state space excludes the geographical location and the longitudinal velocity, and the second state space excludes the lateral lane offset, the angular lane offset, and the longitudinal velocity; and wherein the vehicular driving assistance system, based on (i) the determined lateral lane offset of the equipped vehicle, (ii) the determined angular offset of the equipped vehicle (iii) the determined geographical location of the equipped vehicle, (iv) the determined longitudinal velocity of the equipped vehicle, (v) the determined yaw rate of the equipped vehicle, (vi) the determined roll of the equipped vehicle and (vii) the determined pitch of the equipped vehicle, controls at least one selected from the group consisting of (a) steering of the equipped vehicle and (b) velocity of the equipped vehicle.

12. The vehicular driving assistance system of claim 11, wherein the vehicular driving assistance system determines, using the third Kalman filter, (i) the longitudinal velocity of the equipped vehicle, (ii) the yaw rate of the equipped vehicle, (iii) the roll of the equipped vehicle and (iv) the pitch of the equipped vehicle based at least in part on (a) odometry data captured by an odometer of the equipped vehicle and (b) inertial measurement data captured by an inertial measurement unit of the equipped vehicle.

13. The vehicular driving assistance system of claim 11, wherein the vehicular driving assistance system controls the at least one selected from the group consisting of (i) steering of the equipped vehicle and (ii) velocity of the equipped vehicle based in part on (a) the determined longitudinal velocity of the equipped vehicle, (b) the determined yaw rate of the equipped vehicle, (c) the determined roll of the equipped vehicle and (d) the determined pitch of the equipped vehicle.

14. A vehicular driving assistance system, the vehicular driving assistance system comprising:

a camera disposed at an in-cabin side of a windshield of a vehicle equipped with the vehicular driving assistance system, the camera viewing forward of the equipped vehicle through the windshield of the equipped vehicle;

wherein the camera is operable to capture image data;

wherein the camera comprises an imager, and wherein the imager comprises a CMOS imaging array having at least one million photosensors arranged in rows and columns;

an electronic control unit (ECU) comprising electronic circuitry and associated software;

wherein the electronic circuitry of the ECU comprises at least one data processor;

wherein image data captured by the camera is transferred to and is processed at the ECU, and wherein GPS data captured by a global positioning system is transferred to and processed at the ECU;

wherein the vehicular driving assistance system, via processing at the ECU of image data captured by the camera, determines lane markers for a traffic lane along which the equipped vehicle is traveling;

wherein the vehicular driving assistance system, via processing at the ECU of image data captured by the camera and based at least in part on the determined lane markers, determines a lateral lane offset of the equipped vehicle using a first Kalman filter comprising a first state space;

wherein the vehicular driving assistance system, via processing at the ECU of GPS data transferred to the ECU, determines a geographical location of the equipped vehicle using a second Kalman filter comprising a second state space;

wherein the vehicular driving assistance system determines a longitudinal velocity of the equipped vehicle using a third Kalman filter having a third state space;

wherein the first Kalman filter, the second Kalman filter, and the third Kalman filter are independent from each other such that the first state space excludes the geographical location and the longitudinal velocity, and the second state space excludes the lateral lane offset and the longitudinal velocity;

wherein a failure of the global positioning system does not change the determination of the lateral lane offset;

wherein a failure of the camera does not change the determination of the geographical location of the equipped vehicle; and wherein the vehicular driving assistance system, based on the determined lateral lane offset of the equipped vehicle, the determined longitudinal velocity, and the determined geographical location of the equipped vehicle, controls at least one selected from the group consisting of (i) steering of the equipped vehicle and (ii) velocity of the equipped vehicle.

15. The vehicular driving assistance system of claim 14, wherein the vehicular driving assistance system determines the geographical location of the equipped vehicle based in part on map data.

16. The vehicular driving assistance system of claim 14, wherein the vehicular driving assistance system, using the first Kalman filter, determines an angular lane offset of the equipped vehicle.

17. The vehicular driving assistance system of claim 14, wherein the vehicular driving assistance system, using the third Kalman filter, further determines (i) a yaw rate of the equipped vehicle, (ii) a roll of the equipped vehicle and (iii) a pitch of the equipped vehicle.

* * * * *